US011199399B2

(12) United States Patent
Dubost et al.

(10) Patent No.: US 11,199,399 B2
(45) Date of Patent: Dec. 14, 2021

(54) SYSTEM, METHOD AND APPARATUS FOR DRYWALL JOINT DETECTION AND MEASUREMENT

(71) Applicant: CERTAINTEED GYPSUM, INC., Malvern, PA (US)

(72) Inventors: Brice Dubost, Newton, MA (US); Sidath S. Wijesooriya, Wayland, MA (US); Rachel Z. Pytel, Newton, MA (US)

(73) Assignee: CERTAINTEED GYPSUM, INC., Malvern, PA (US)

(*) Notice: Subject to any disclaimer, the term of this patent is extended or adjusted under 35 U.S.C. 154(b) by 36 days.

(21) Appl. No.: 15/709,669

(22) Filed: Sep. 20, 2017

(65) Prior Publication Data

US 2018/0080762 A1 Mar. 22, 2018

Related U.S. Application Data

(60) Provisional application No. 62/397,127, filed on Sep. 20, 2016.

(51) Int. Cl.
*G06T 7/62* (2017.01)
*G01B 11/25* (2006.01)
(Continued)

(52) U.S. Cl.
CPC .......... *G01B 11/2518* (2013.01); *G01B 11/25* (2013.01); *G01B 11/303* (2013.01);
(Continued)

(58) Field of Classification Search
CPC ... G01B 11/2518; G01B 11/303; G01B 11/25; G01B 11/14; G01B 11/00; G06T 7/62;
(Continued)

(56) References Cited

U.S. PATENT DOCUMENTS 5,506,683 A * 4/1996 Yang .................. G01B 11/2504
356/606
5,864,956 A 2/1999 Dong
(Continued)

FOREIGN PATENT DOCUMENTS

CN 202522209 U 11/2012
CN 103438824 A 12/2013
(Continued)

OTHER PUBLICATIONS

International Search Report and Written Opinion for PCT/US2017/052386, dated Feb. 6, 2018, 14 pages.
(Continued)

*Primary Examiner* — Patrick E Demosky
(74) *Attorney, Agent, or Firm* — Abel Schillinger, LLP; Thomas H. Osborn (57) ABSTRACT

A system for visually enhancing a surface. For example, the system may include an assembly that may be configured to project a laser line across at least a portion of the surface. Versions of the laser line may be projected at an angle of incidence relative to a plane defined by the surface. For example, the angle of incidence may be in a range of about 5 degrees to about 60 degrees. In one version, the laser line may be substantially perpendicular to a central axis of the surface. In addition, the laser line may enable enhanced, qualitative user visualization of the surface and non-planar distortion in the surface.

20 Claims, 6 Drawing Sheets

(51) Int. Cl.
*G06T 7/00* (2017.01)
*G06T 7/521* (2017.01)
*G01B 11/30* (2006.01)

(52) U.S. Cl.
CPC ............ *G06T 7/0004* (2013.01); *G06T 7/521* (2017.01); *G06T 7/62* (2017.01); *G06T 2207/10004* (2013.01); *G06T 2207/30108* (2013.01); *G06T 2207/30132* (2013.01)

(58) Field of Classification Search
CPC . G06T 2207/10004; G06T 2207/30108; G06T 3/005; G06T 7/521; G06T 2207/10028; H04N 9/3185; H04N 9/3147; H04N 13/02; H04N 13/00; G03B 21/005; G01S 17/08

See application file for complete search history.

(56) References Cited

U.S. PATENT DOCUMENTS

| | | | |
|---|---|---|---|
| 7,487,596 B2 | 2/2009 | Nash | |
| 7,612,872 B2 | 11/2009 | Konetschny et al. | |
| 7,697,721 B2 | 4/2010 | Rubbert et al. | |
| 9,222,771 B2 | 12/2015 | Rosengaus et al. | |
| 2004/0258126 A1 | 12/2004 | Levine | |
| 2006/0179672 A1 | 8/2006 | Tacklind | |
| 2006/0191147 A1 | 8/2006 | Wu | |
| 2007/0149882 A1* | 6/2007 | Wedel | A61B 5/0059 600/476 |
| 2007/0150228 A1* | 6/2007 | Fukumoto | G01B 11/2518 702/155 |
| 2008/0046221 A1 | 2/2008 | Stathis | |
| 2011/0124410 A1* | 5/2011 | Mao | A63F 13/212 463/31 |
| 2011/0216288 A1* | 9/2011 | Rutledge | G03B 21/14 353/70 |
| 2012/0318775 A1* | 12/2012 | Schwarz | B23K 26/032 219/121.63 |
| 2013/0326892 A1* | 12/2013 | Schorr | G01C 15/02 33/228 |
| 2014/0104416 A1* | 4/2014 | Giordano | G01B 11/02 348/135 |
| 2014/0259600 A1 | 9/2014 | Kalibarda et al. | |
| 2015/0273604 A1 | 10/2015 | Anderson et al. | |
| 2016/0134860 A1* | 5/2016 | Jovanovic | G01B 21/042 348/50 |

FOREIGN PATENT DOCUMENTS

| | | | | |
|---|---|---|---|---|
| CN | 203615935 U | 5/2014 | | |
| CN | 103925892 A | 7/2014 | | |
| CN | 204612677 U | 9/2015 | | |
| DE | 102009054591 A1 | 6/2011 | | |
| DE | 102010042650 A1 | 8/2011 | | |
| JP | 2002364168 A | 12/2002 | | |
| WO | 2011082846 A1 | 7/2011 | | |
| WO | WO-2011082846 A1 * | 7/2011 | ......... | G01B 11/2513 |
| WO | 2011098608 A1 | 8/2011 | | |

OTHER PUBLICATIONS

Al-Turaif et al., "Evolution of surface structure and chemistry of pigmented coatings during drying," Progress in Organic Coatings, 2000, pp. 43-52, vol. 38, Issue 1, Elsevier (abstract only).

Al-Turaif et al., "The influence of substrate absorbency on coating surface chemistry," Progress in Organic Coatings, 2002, pp. 307-315, vol. 44, Elsevier.

Heilbronner, R. P., "The autocorrelation function: an image processing tool for fabric analysis," Tectonophysics, 1992, pp. 351-370, vol. 212, Issues 3-4, Elsevier (abstract only).

Oren et al., "Generalization of Lambert's Reflectance Model," Proceedings of the 21st annual conference on computer graphics and interactive techniques, 1994, pp. 239-246, ACM.

Phong, B.T., "Illumination for Computer-Generated Pictures," Communications of the Association for Computing Machinery, 1975, pp. 311-317, vol. 18, No. 6.

Russ, J., "The Image Processing Handbook," 2011, 972 pages, CRC Press (preview only).

Zhu et al., "Anisotropic Slope Distribution and Bidirectional Reflectance of a Rough Silicon Surface," Journal of Heat Transfer, 2004, pp. 985-993, vol. 126, No. 6, ASME (abstract only).

* cited by examiner

SYSTEM, METHOD AND APPARATUS FOR DRYWALL JOINT DETECTION AND MEASUREMENT

CROSS-REFERENCE TO RELATED APPLICATION(S)

This application claims priority under 35 U.S.C. § 119(e) to U.S. Provisional Patent Application No. 62/397,127, entitled "SYSTEM, METHOD AND APPARATUS FOR DRYWALL JOINT DETECTION AND MEASUREMENT," by Brice Dubost et al., filed Sep. 20, 2016, which is assigned to the current assignee hereof and incorporated herein by reference in its entirety.

BACKGROUND OF THE INVENTION

Field of the Disclosure

The present invention relates in general to gypsum panels and, in particular, to a system, method and apparatus for detecting and measuring drywall joints.

Description of the Related Art

Conventional joints between drywall or wall board panels include an intersection between panels. A joint also may include any materials applied at or adjacent to the intersection to increase its mechanical stability and to reduce the appearance of the intersection.

Interior residential and commercial drywall joints typically are completed at one of three different levels of quality or finish. For example, a "Level 3" finish, as is known to those of ordinary skill in the art, includes tape embedded in joint compound at all joints and interior angles, which are immediately wiped with a joint knife leaving a thin coating of joint compound over all joints and interior angles. One separate coat of joint compound is applied over all joints and interior angles. Fastener heads and accessories are covered with two separate coats of joint compound. The surface shall be smooth and free of tool marks and ridges. A "Level 4" finish includes everything in a Level 3 finish, however an additional separate coat of joint compound is applied over all flat joints and one separate coat of joint compound is applied over Interior angles. Fastener heads and accessories are covered with three separate coats of joint compound. At the highest level of quality, a "Level 5" finish includes everything in a Level 4 finish. In addition, a thin skim coat of joint compound or a material manufactured especially for this purpose, is applied to the entire surface.

Accordingly, conventional drywall levels of finish are merely prescriptive in nature. They substantially require only a list of steps to be completed, rather than being qualitatively or quantitatively defined. Although prescriptive definitions of drywall finishes are workable, more precise and accurate tools and methods of defining different levels of drywall finishes continue to be of interest.

SUMMARY

Embodiments of a system, method and apparatus for a laser system for visually enhancing a geometry of a joint between panels that form at least a portion of a wall are disclosed. For example, the system may include an assembly configured to be positioned on a surface other than the wall itself. The assembly may be configured to project a laser line across at least a portion of the wall and the joint. Versions of the laser line may be projected at an angle of incidence relative to a plane defined by the wall. For example, the angle of incidence may be in a range of about 5 degrees to about 60 degrees. In one version, the laser line may be substantially perpendicular to the joint. In another version, the laser line may be substantially perpendicular to a central axis of a surface that may or may not include the joint. In addition, the laser line may enable enhanced, qualitative user visualization of the joint and non-planar distortion in the joint relative to the plane defined by the wall.

Embodiments of a system for measuring a geometry of a joint between panels that form at least a portion of a wall also are disclosed. For example, the system may include an assembly configured to be positioned on a surface other than the wall itself. The assembly may be configured to project a laser line across at least a portion of the wall and the joint. The laser line may be projected at an angle of incidence relative to a plane defined by the wall. For example, the angle of incidence can be in a range of about 5 degrees to about 60 degrees. The laser line also may be substantially perpendicular to the joint. In a version, the laser line can enable enhanced, qualitative user visualization of the joint and non-planar distortion in the joint relative to the plane defined by the wall. The system can include a reference guide configured to be located on the wall adjacent to the laser line. The reference guide can include a physical reference guide, a virtual reference guide, or a combination thereof. The system may have a camera configured to digitally image the laser line and the reference guide. In addition, the system may include a computer configured to be coupled to the camera and quantify the geometry of the wall based on the digital images, parameters of the laser line, the reference guide and a distance between the camera and the wall, such that a quality of the joint is measured.

Embodiments of a method of assessing a geometry of a joint between drywall panels on a wall may include the following: projecting a laser image across the joint; positioning a reference guide on the wall adjacent to the laser image; digitally imaging the laser image and the reference guide; and processing the digital images and quantifying the geometry of the joint based on the digital images, parameters of the laser image and the reference guide, such that a quality of the joint is determined.

In an alternate embodiment, a method of preparing a surface may include constructing a wall having panels that engage at intersections; detecting a planarity and non-planarity of the intersections, and adjusting non-planar intersections into planar intersections; applying material to the planar intersections to conceal the planar intersections and form joints; and then detecting a planarity and non-planarity of the joints, and adjusting non-planar joints into planar joints.

The foregoing and other objects and advantages of these embodiments will be apparent to those of ordinary skill in the art in view of the following detailed description, taken in conjunction with the appended claims and the accompanying drawings.

BRIEF DESCRIPTION OF THE DRAWINGS

So that the manner in which the features and advantages of the embodiments are attained and can be understood in more detail, a more particular description may be had by reference to the embodiments thereof that are illustrated in the appended drawings. However, the drawings illustrate

The use of the same reference symbols in different drawings indicates similar or identical items.

DETAILED DESCRIPTION

Embodiments of a system, method and apparatus for drywall joint detection and measurement are disclosed. As will be described herein, the claimed invention can enable user visualization of something (e.g., a joint) that is difficult to see or not readily visible to become readily visible and, if desired, qualitatively and/or quantitatively evaluated.

In some embodiments, a system for visually enhancing a geometry of a joint 103 (FIGS. 1 and 2) between panels 105 that form at least a portion of a wall 107 is disclosed. In an example, the system may include an assembly 101 configured to be positioned on a surface 109. The surface 109 may comprise a surface other than the wall 107 itself. The assembly 101 may be configured to project a laser line 111 across at least a portion of the wall 107 and the joint 103. Although a vertical wall is shown in the drawings, the wall 107 could be a horizontal wall, a ceiling, or an angled wall, such as a gabled wall or gabled ceiling. Accordingly, the laser line 111 can be horizontal and the system may be configured to visually enhance the geometry of a vertical joint. Alternatively, the laser line can be vertical and the system may be configured to visually enhance the geometry of a horizontal joint. In other versions, the joint may not be horizontal and nor vertical, and the laser line can still be perpendicular to the joint regardless of an orientation of the joint. The laser line 111 may be a continuous line or a discontinuous line, such as a dashed or dotted line.

Figure 1:
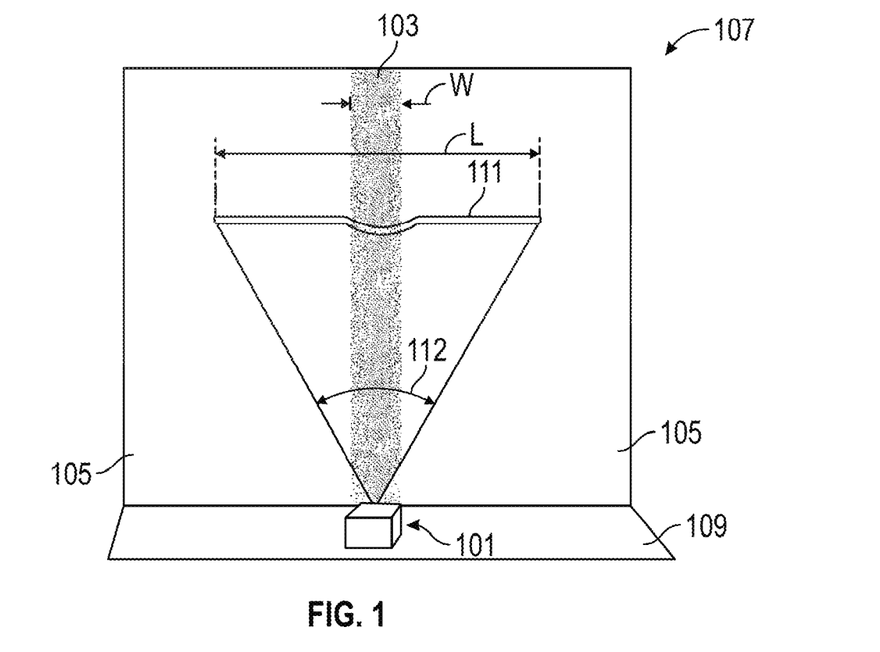
FIG. 1 is a schematic front view of an embodiment of a laser system.
Figure 2:
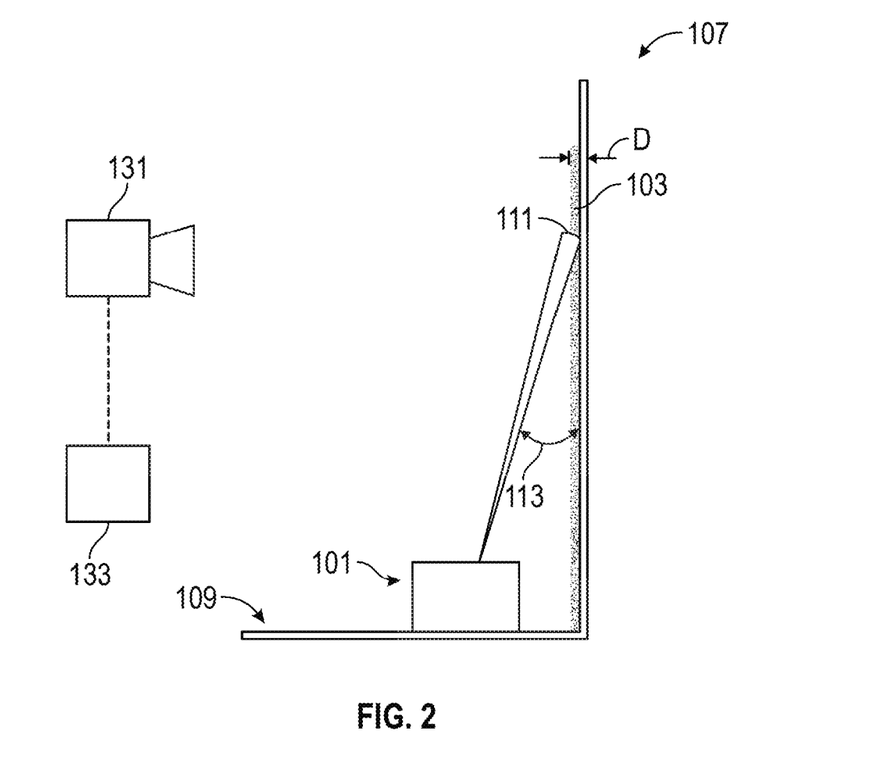
FIG. 2 is a schematic side view of the laser system of FIG. 1.

While the assembly 101 is shown resting on a floor in FIGS. 1 and 2, the assembly 101 may be affixed to a tripod or other stand. Moreover, the assembly 101 may be mounted on, or otherwise hung from, a ceiling. In such an aspect, the assembly 101 may be mounted upside down and may project the laser line 111 in a downward direction away from the assembly 101. In another aspect, the assembly 101 can be mounted on a wheeled stand that a user, or finisher, can easily move as he or she moves along the wall to apply wall compound. Moreover, the assembly 101 can be mounted on a bracket, or clamp, that can be affixed to scaffolding, a ladder, a lift, or other similar device. The bracket, or clamp, can be magnetic or mechanical. In yet another aspect, the assembly 101 can be sufficiently small in size that it can be mounted to the finisher, e.g., to the belt of the finisher or on a helmet worn by the finisher.

Further, the laser line 111 may include multiple horizontal lines or multiple vertical lines. In the alternative, the laser line 111 may include a grid of horizontal lines and vertical lines. The grid lines may be spaced apart a predetermined distance—vertically and horizontally. For example, the grid lines may have a grid spacing that is greater than or equal to 0.5 feet. In another aspect, the grid spacing may be greater than or equal to 1.0 feet, such as greater than or equal 1.5 feet, greater than or equal to 2.0 feet, greater than or equal to 2.5 feet, greater than or equal to 3.0 feet. In another aspect, the grid spacing may be less than or equal to 8.0 feet. Further, the grid spacing may be less than or equal to 7.5 feet, such as less than or equal to 7.0 feet, less than or equal to 6.5 feet, less than or equal to 6.0 feet, less than or equal to 5.5 feet, less than or equal to 5.0 feet, less than or equal to 4.5 feet, less than or equal to 4.0 feet, or less than or equal to 3.5 feet. It is to be understood that the grid spacing can be with a range between, and including, any of the minimum or maximum values for the grid spacing described herein.

In another aspect, the laser line 111 can include a single line that scans up and down or side to side. Further, the laser line 111 can include a plurality of lines that are concentrated at eye level to the user.

Although the system is illustrated with a single joint 103, the laser system also may be configured to simultaneously visually enhance geometries of a plurality of joints 103. Moreover, the system may be configured to simultaneously visually enhance a wall geometry of an entirety of the wall 107. Depending on the application, the assembly 101 may be configured to be positioned against the wall 107 or away from the wall 107. For example, the assembly 101 may positioned at a distance away from the wall 107 in a range of, e.g., about 0 inches to about 48 inches.

Embodiments of the laser line 111 may include a length L, such as a prescribed length. For example, the length of the laser line 111 can be at least about 0.1 meters, such as at least about 0.25 meters, or even at least about 0.5 meters. In other versions, the length of laser line 111 can be not greater than about 10 meters, such as not greater than about 9 meters, not greater than about 8 meters, not greater than about 7 meters, not greater than about 6 meters, not greater than about 5 meters, not greater than about 4 meters, or even not greater than about 3 meters. Other versions of the length of laser line 111 can be in a range between any of these values.

In some versions, the assembly 101 may emit the laser line 111 at a fan angle 112 (FIG. 1). For example, the fan angle 112 can be at least about 10 degrees, such as at least about 20 degrees, or even at least about 30 degrees. In other versions, the fan angle 112 can be not greater than about 160 degrees, such as not greater than about 150 degrees, or even not greater than about 140 degrees. Other versions of the fan angle 112 can be in a range between any of these values.

In some versions, the laser line 111 may be projected at an angle of incidence 113 (FIG. 2) relative to a plane defined by the wall 107. Embodiments of the angle of incidence 113 can be at least about 1 degree. In other versions, the angle of incidence 113 can be at least about 2 degrees, such as at least about 3 degrees, at least about 4 degrees, at least about 5 degrees, at least about 10 degrees, at least about 15 degrees, or even at least about 20 degrees. In other embodiments, the angle of incidence 113 can be not greater than about 60 degrees. In other examples, the angle of incidence 113 can be not greater than about 55 degrees, such as not greater than about 50 degrees, not greater than about 45 degrees, or even not greater than about 40 degrees. In still other embodiments, the angle of incidence 113 can be in a range between any of these values.

In some versions, the laser line 111 can be substantially perpendicular to the joint 103. Embodiments of the laser line 111 may enable enhanced, qualitative user visualization of the joint 103, and non-planar distortion in the joint 103 relative to the plane defined by a nominal surface of the wall 107. Versions of the laser line 111 may enable visualization of distortion as a slope of the joint 103. For example, the slope may be defined as a maximum dimension D (shown exaggerated in FIG. 2; e.g., a protrusion or a recession) of the joint 103 that is perpendicular to the plane defined by the wall 107, divided by half of a maximum width W (FIG. 1) of the joint 103 that is parallel to the plane and perpendicular to an intersection between the panels 105. In one example, the slope can be not less than about 0.00001 mm. In another example, that distortion (e.g., the maximum dimension D) can be as small as 0.1 mm from the plane defined by the wall 107.

Figure 3:
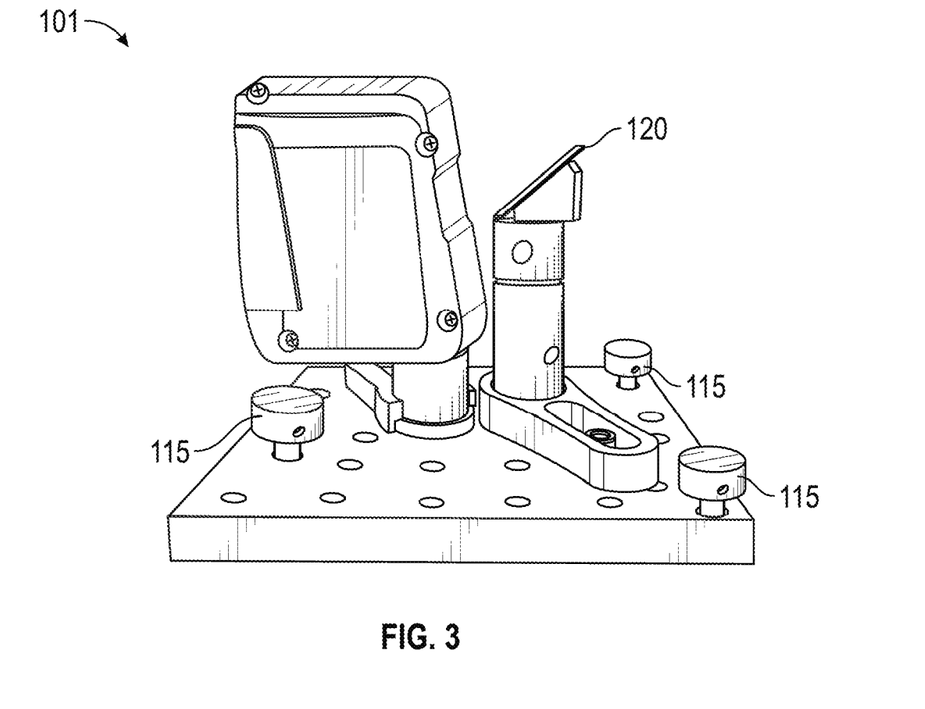
FIG. 3 is a side view of another embodiment of a laser system.

In some versions, the assembly 101 also may include leveling means 115 (FIG. 3). The leveling means 115 may be configured to enable a user to manual level (e.g., with respect to gravity or vertical) the assembly 101. For example, the leveling means 115 comprises elevation screws. In other versions, the assembly 101 may be configured to be self-leveling. In some examples, a laser 117 (FIG. 4) of the assembly 101 may be mounted to a pendulum 119. The pendulum 119 may include one, two or three degrees of freedom. Versions of the pendulum 119 may include magnetic braking. An example of magnetic braking is depicted at: http://video.mit.edu/watch/mit-physics-demo-pendulum-and-magnet-3078/, which is incorporated herein by reference in its entirety.

Embodiments of the assembly 101 may include a mirror 120 (FIG. 3). For example, mirror 120 may be configured to redirect the laser line 111 at the wall 107. In some versions, the mirror 120 may be oriented at an angle with respect to a mean plane of the wall 107. In some versions, the angle of the mirror 120 can be in a range of about 45 degrees to about 60 degrees.

Figure 11A:
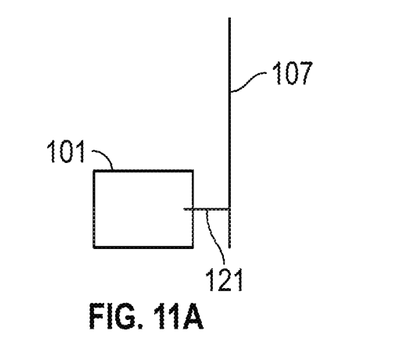
FIGS. 11A, 11B and 11C are schematic side, top and isometric views, respectively, of another embodiment of a laser system.
Figure 11B:
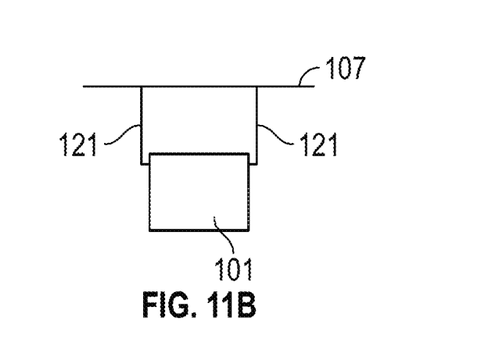
Figure 11C:
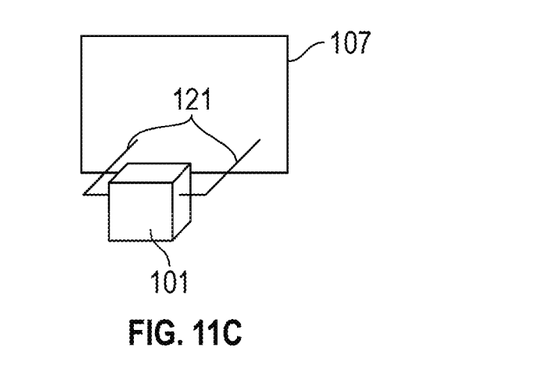

As shown in FIGS. 11A-11C, embodiments of the assembly 101 also may include a wall alignment feature 121. The wall alignment feature 121 may be configured to set at least one of distance of the assembly 101 from the wall 107 and orientation of the assembly 101 relative to the wall 107. For example, the wall alignment feature 121 may include extensions configured to engage the wall 107. In some versions, the extensions may be configured to engage the wall 107 and set orientation by perpendicularly aligning the assembly 101 relative to the wall 107. In one embodiment, the extensions may comprise retractable rods.

As shown in FIG. 2, the system also may include a camera 131 and a computer 133 coupled to the camera 131. In some versions, the camera 131 and computer 133 may be combined in a single device, such as a smart phone.

Figure 12:
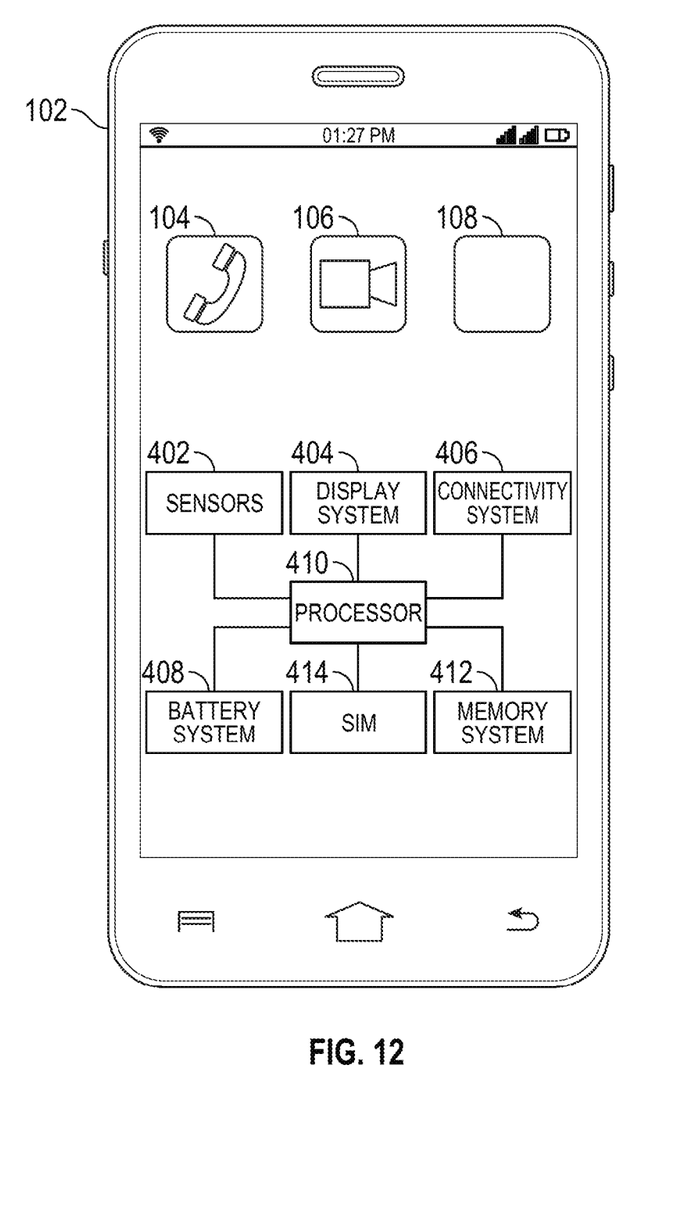
FIG. 12 illustrates an exemplary portable device executing a plurality of exemplary applications.

In FIG. 12, an embodiment of a portable device 102 may include a wearable smart phone communications device (e.g., computer 133) that executes multiple applications. For example, portable device 133 executes a wireless communications application (e.g., telephony application 104), a content delivery application 106 (e.g., camera 131), and other applications 108. Computer 133 may include a battery system 408, and a processor 410 configured to execute instructions stored in memory system 412. Portable device 102 may include subscriber identity module 414 and connectivity system 406 to facilitate wireless or wired communications consistent with one or more protocols for wide area networks. Such networks may include a satellite or terrestrial wide area network using, e.g., Long-Term Evolution (LTE), second-Generation (2G), third-Generation (3G), fourth-generation (4G), LTE-Advanced, LTE in unlicensed spectrum (LTE-U), Global System for Mobile Communications (GSM), Enhanced Data rates for GSM Evolution (EDGE), High Speed Packet Access (HSPA), Universal Mobile Telecommunications System (UMTS), and Worldwide Interoperability for Microwave Access (WiMax) wireless communications, or other wireless communications protocols, which use one or more of Code Division Multiple access (CDMA), Time Division Multiple Access (TDMA), Frequency Division Multiple Access (FDMA), Wideband CDMA (WCDMA), Orthogonal Frequency Division Multiple Access (OFDMA), or other suitable communications techniques), local area networks (e.g., Institute of Electrical and Electronics Engineers (IEEE) 802.11 standard-compliant networks), or other network protocols. Sensors 402 and display system 404 may be configured to communicate with a user, although other input and output devices (e.g., keyboard) may be included.

Examples of the computer 133 may be configured to quantify the geometry of the joint 103 based on a digital image from the camera 131. In some versions, the geometry may be quantified by expressing the non-planar distortion of the joint 103 along the laser line 111, and defining a width W (FIG. 1) of the joint 103 and a slope of edges of the joint 103.

Embodiments of the system may further comprise a reference guide. For example, the reference guide may be configured to be located on the wall 107 adjacent to the laser line 111. Alternatively, the reference guide may be a virtual reference guide that is simulated by the computer 131. Versions of the reference guide may include one or more of the following: an object configured to be physically mounted to the wall (e.g., ruler); a pre-defined image projected on the wall (e.g., fiducial marker); and a laser image projected on the wall. In one example, the laser image may be configured to be analyzed by a computer using a Hough transform to retrieve perspective information and/or line location.

The computer 133 may be configured to be coupled to the camera 131 and quantify the geometry of the wall 107 based on the digital images, parameters of the laser line 111, the reference guide and a distance between the camera 131 and the wall 107, such that a quality of the joint 103 is measured. Examples of the parameters of the laser line 111 may include length, non-linear distortion, etc. See, e.g., https://www.picotronic.de/picopage/en/product/detail/code/70115369 for an example. The angle of camera 131 may be orthogonal to a mean plane of the wall 107.

Figure 4:
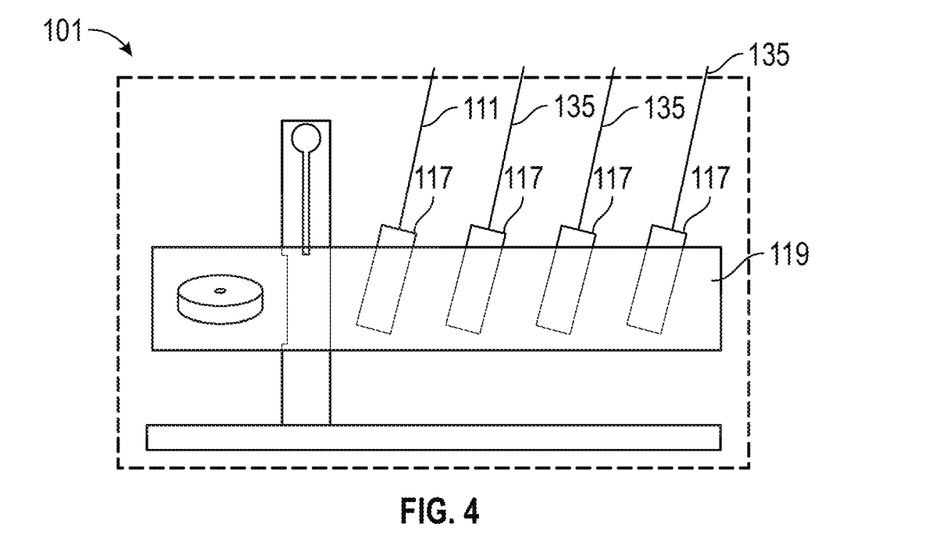
FIG. 4 is an enlarged, schematic side view of still another embodiment of a laser system.
Figure 5:
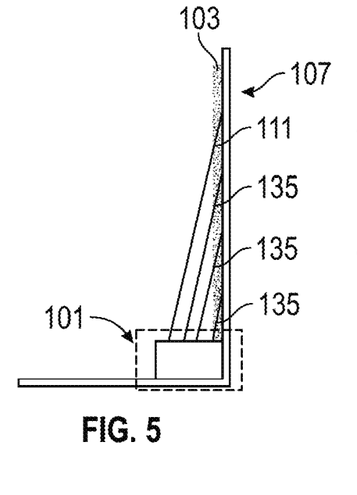
FIG. 5 is a schematic side view of the laser system of FIG. 4.
Figure 6:
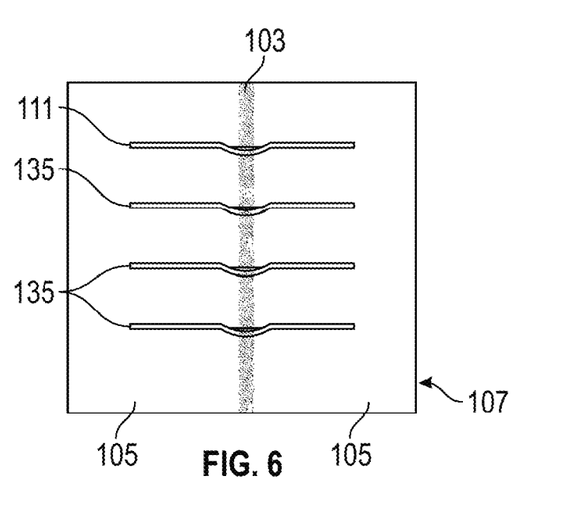
FIG. 6 is a schematic front view of the laser system of FIG. 5.

As shown in FIGS. 4-6, the assembly 101 may include a plurality of lasers 117. Thus, in some examples, the laser image of the reference guide may include a plurality of laser images, such as at least 3 laser images. In the illustrated embodiment, the laser image comprises additional laser lines 135. Some versions of the additional laser lines 135 may be parallel to each other. Optionally, the additional laser lines 135 may be configured to be substantially perpendicular to the joint 103. Alternatively, the assembly 101 may consist of only one laser 117.

Figure 7:
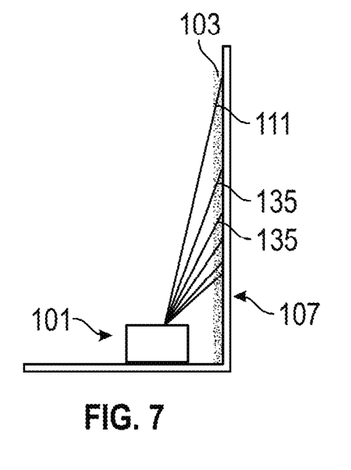
FIG. 7 is a schematic side view of another embodiment of a laser system.
Figure 8:
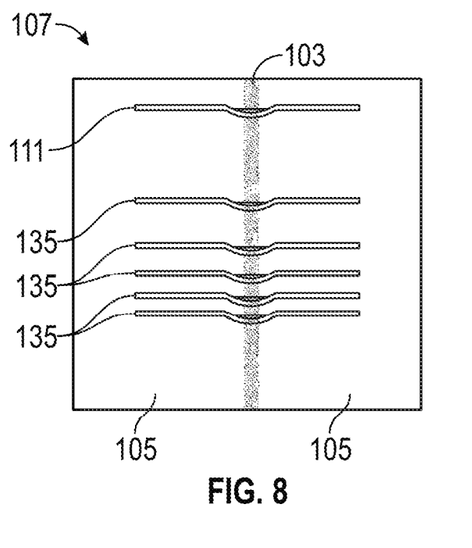
FIG. 8 is a schematic front view of the laser system of FIG. 7.

As shown in FIGS. 7 and 8, the additional laser lines 135 may be at different angles with respect to the assembly 101. In an example, each of the additional laser lines 135 may be at an angle of separation relative to an adjacent laser line 135, and the angles of separation can be identical, as shown. In contrast, the additional laser lines 135 can be at a same angle with respect to the assembly 101, as shown in FIGS. 4 and 5.

Figure 9:
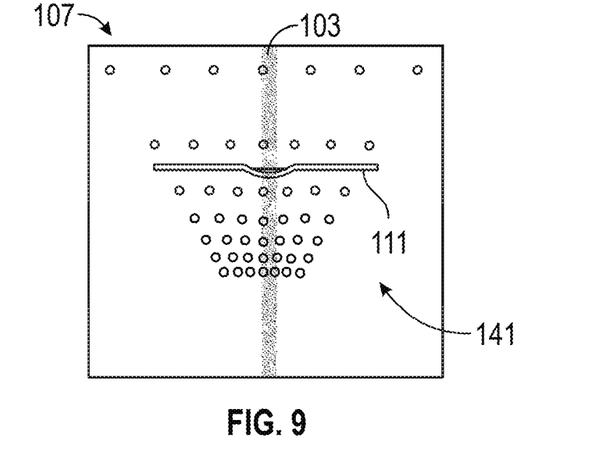
FIG. 9 is a schematic side view of another embodiment of a laser system.
Figure 10:
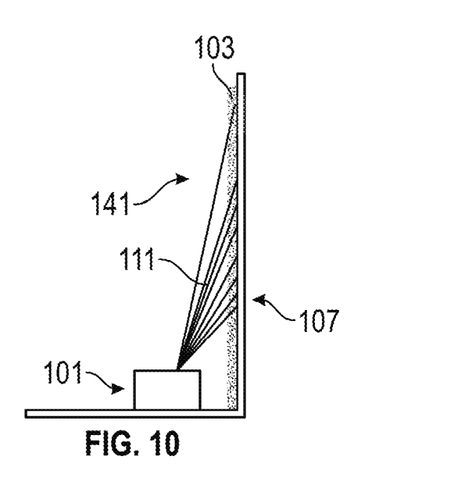
FIG. 10 is a schematic front view of the laser system of FIG. 9.

FIGS. 9 and 10 depict an embodiment of the system wherein the laser image comprises a grid 141 of laser dots. In an example, the grid 141 of laser dots may comprise a wavelength of light that differs from that of the laser line 111. In some versions, horizontal and vertical distances between the laser dots may be configured to be calculated by the computer 133 (FIG. 2) based on the digital image from the camera 131.

In some embodiments of the system, the assembly 101 may be configured to not rotate about an axis perpendicular to the surface 109 on which the assembly 101 is positioned.

Embodiments of a method of assessing a geometry of a joint 103 between drywall panels 105 on a wall 107 also is disclosed. For example, the method may include projecting a laser image across the joint 103; positioning a reference guide (e.g., such as those described herein) on the wall 107 adjacent to the laser image; digitally imaging the laser image and the reference guide; and processing the digital images and quantifying the geometry of the joint 103 based on the digital images, parameters of the laser image and the reference guide, such that a quality of the joint 103 is determined.

In some versions, the projecting step may include projecting a plurality of laser images across the joint 103. Embodiments of the positioning step may include at least one of: physically mounting an object to the wall; projecting a pre-defined image projected on the wall; and projecting a laser image on the wall. In an example, the digitally imaging step may comprise using a camera 131, and the final step may include quantifying the geometry of the joint 103 further based on a distance between the camera 131 and the wall 107. Alternatively, a geometry of a plurality of joints, or a geometry of an entirety of the wall also may be quantified.

In another embodiment, a method of preparing a surface is disclosed. For example, the method may include constructing a wall 107 having panels 105 that engage at intersections; detecting a planarity and non-planarity of the intersections, and adjusting non-planar intersections into planar intersections (e.g., by moving the panels); applying material to the planar intersections to conceal the planar intersections and form joints; and then detecting a planarity and non-planarity of the joints, and adjusting non-planar joints into planar joints.

In some versions, the constructing step may include fastening the panels 105 to a frame to form the wall 107. The detecting steps may include visually enhancing a geometry of the intersections or joints by projecting a laser line 111 across the intersections or joints, the laser line is substantially perpendicular to the intersections or joints, and the laser line enables enhanced, qualitative user visualization of the intersections or joints and non-planar distortion in the intersections or joints relative to a plane defined by the wall 107. Versions of the applying material step and adjusting step may include at least one of taping, applying plaster or joint compound, wiping, washing, and wet or dry sanding the planar intersections.

It can be appreciated that the system for visually enhancing a geometry of a joint as described herein can be calibrated to various finishing tools, e.g., a drywall flat box or other drywall finishing box. The system can provide recommendations to the finishing tool if a problem is detected. For example, if a particular joint is underfilled, the system can instruct a finisher to set the finishing tool to "4" and re-coat the joint. In another example, if one side of a particular joint is low, the system can instruct the finisher to add compound to the low side of the joint. By inputting the type of finishing box being used, a type of joint compound being used, or a combination thereof, the system will be able to provide instructions to a particular finishing tool based on the type of finishing tool being used and based on the type of joint compound being used.

It can be appreciated that the system described herein can also be used to check the flatness of other objects. For example, the system can be used to check the forward alignment of the front faces of adjacent studs. Further, the system can be used to check the flatness of drywall prior to coating the drywall with compound. In another aspect, the system can be used to check the level of insulation fill, i.e., whether sprayed or blown-in insulation completely fills the volume between adjacent studs up to the faces of the studs. In still another aspect, the system can be used to check the flatness or straightness of two surfaces that meet at a corner and check that the corner has a consistent angle along the length of the corner. For any of the uses described herein, the system can provide a visual check and quantify whether the visual check passes or fails a predetermined threshold selected by a user.

Still other versions may include one or more of the following embodiments:

Embodiment 1. A laser system for visually enhancing a geometry of a surface, the system comprising:
  an assembly configured to project a laser line across at least a portion of the surface, the laser line is projected at an angle of incidence relative to a plane defined by the surface, the angle of incidence is in a range of about 1 degree to about 60 degrees, the laser line is substantially perpendicular to a central axis of the surface, and the laser line enables enhanced, qualitative user visualization of the surface and non-planar distortion in the surface.

Embodiment 2. The laser system of any of these embodiments, wherein the surface includes a joint between two gypsum panels, a wall, a face of one or more wall studs, a surface of insulation, or a combination thereof.

Embodiment 3. The laser system of any of these embodiments, wherein the wall comprises a vertical wall, a ceiling, or an angled wall.

Embodiment 4. The laser system of any of these embodiments, wherein the assembly comprises a plurality of lasers.

Embodiment 5. The laser system of any of these embodiments, wherein the assembly further comprises leveling means configured to enable a user to manual level the assembly.

Embodiment 6. The laser system of any of these embodiments, wherein the leveling means comprises elevation screws.

Embodiment 7. The laser system of any of these embodiments, wherein the assembly is configured to be self-leveling.

Embodiment 8. The laser system of any of these embodiments, wherein a laser of the assembly is mounted to a pendulum.

Embodiment 9. The laser system of any of these embodiments, wherein the pendulum is magnetically braked.

Embodiment 10. The laser system of any of these embodiments, wherein the pendulum has two degrees of freedom.

Embodiment 11. The laser system of any of these embodiments, wherein the assembly further comprises a surface alignment feature configured to set at least one of distance of the assembly from the surface and orientation of the assembly relative to the surface.

Embodiment 12. The laser system of any of these embodiments, wherein the surface alignment feature comprises extensions configured to engage the surface.

Embodiment 13. The laser system of any of these embodiments, wherein the extensions are configured to engage the surface and set orientation by perpendicularly aligning the assembly relative to the surface.

Embodiment 14. The laser system of any of these embodiments, wherein the extensions comprise retractable rods.

Embodiment 15. The laser system of any of these embodiments, wherein the laser line has a length in a range of about 0.1 meters to about 10 meters.

Embodiment 16. The laser system of any of these embodiments, wherein the assembly emits the laser line at a fan angle in a range of about 10 degrees to about 160 degrees.

Embodiment 17. The laser system of any of these embodiments, wherein the laser system is configured to simultaneously visually enhance geometries of a plurality of joints.

Embodiment 18. The laser system of any of these embodiments, wherein the laser system is configured to simultaneously visually enhance a wall geometry of an entirety of the wall.

Embodiment 19. The laser system of any of these embodiments, wherein the laser line is horizontal and the system is configured to visually enhance the geometry of a vertical joint.

Embodiment 20. The laser system of any of these embodiments, wherein the laser line is vertical and the system is configured to visually enhance the geometry of a horizontal joint.

Embodiment 21. The laser system of any of these embodiments, wherein the joint is not horizontal and not vertical, and the laser line is perpendicular to the joint regardless of an orientation of the joint.

Embodiment 22. The laser system of any of these embodiments, wherein the assembly comprises a mirror configured to redirect the laser line at the surface.

Embodiment 23. The laser system of any of these embodiments, wherein the mirror is oriented at an angle with respect to a mean plane of the surface, and the angle is in a range of about 45 degrees to about 60 degrees.

Embodiment 24. The laser system of any of these embodiments, wherein the laser line enables visualization of distortion as a slope of the surface, and the slope is defined as a maximum dimension of the joint that is perpendicular to the plane defined by the wall, divided by half of a maximum width of the joint that is parallel to the plane and perpendicular to an intersection between the panels.

Embodiment 25. The laser system of any of these embodiments, wherein the slope is not less than about 0.00001.

Embodiment 26. The laser system of any of these embodiments, further comprising a camera and a computer coupled to the camera, wherein the computer is configured to quantify the geometry of the joint based on a digital image from the camera.

Embodiment 27. The laser system of any of these embodiments, wherein the geometry is quantified by expressing the non-planar distortion of the joint along the laser line, and defining a width of the joint and a slope of edges of the joint.

Embodiment 28. The laser system of any of these embodiments, wherein the assembly is configured to be positioned away from the surface at a distance in a range of about 0 inches to about 48 inches.

Embodiment 29. The laser system of any of these embodiments, further comprising a reference guide configured to be located on the surface adjacent to the laser line.

Embodiment 30. The laser system of any of these embodiments, wherein the reference guide comprises at least one of:
an object configured to be physically mounted to the surface;
a pre-defined image projected on the surface; and
a laser image projected on the surface.

Embodiment 31. The laser system of any of these embodiments, wherein the laser image is configured to be analyzed by a computer using a Hough transform.

Embodiment 32. The laser system of any of these embodiments, wherein the laser image comprise at least 3 laser images.

Embodiment 33. The laser system of any of these embodiments, wherein the laser image comprises additional laser lines.

Embodiment 34. The laser system of any of these embodiments, wherein the additional laser lines are parallel to each other.

Embodiment 35. The laser system of any of these embodiments, wherein the additional laser lines are configured to be substantially perpendicular to the joint.

Embodiment 36. The laser system of any of these embodiments, wherein the additional laser lines are at different angles with respect to the assembly.

Embodiment 37. The laser system of any of these embodiments, wherein each of the additional laser lines are at an angle of separation relative to an adjacent laser line, and the angles of separation are identical.

Embodiment 38. The laser system of any of these embodiments, wherein the additional laser lines are at a same angle with respect to the assembly.

Embodiment 39. The laser system of any of these embodiments, wherein the laser image comprises a grid of laser dots.

Embodiment 40. The laser system of any of these embodiments, wherein the laser dots comprise a wavelength of light that differs from that of a laser line.

Embodiment 41. The laser system of any of these embodiments, wherein horizontal and vertical distances between the laser dots are configured to be calculated by a computer based on a digital image from a camera.

Embodiment 42. The laser system of any of these embodiments, wherein the assembly does not rotate about an axis perpendicular to the surface on which the assembly is positioned.

Embodiment 43. The laser system of any of these embodiments, wherein the assembly consists of only one laser.

Embodiment 44. A system for measuring a geometry of a surface, the system comprising:
an assembly configured to project a laser line across at least a portion of the surface, the laser line is projected at an angle of incidence relative to a plane defined by the surface, the angle of incidence is in a range of about 1 degree to about 60 degrees, the laser line is substantially perpendicular to a central axis of the surface, and the laser line enables enhanced, qualitative user visualization of the surface and non-planar distortion in the surface; and
a reference guide configured to be located on the surface or simulated adjacent to the laser line.

Embodiment 45. The system of any of these embodiments, further comprising
  a camera configured to digitally image the laser line and the reference guide; and
  a computer configured to be coupled to the camera and quantify the geometry of the surface based on the digital images, parameters of the laser line, the reference guide and a distance between the camera and the surface, such that a quality of the surface is measured.

Embodiment 46. The system of any of these embodiments, wherein the reference guide comprises a virtual reference guide.

Embodiment 47. The system of any of these embodiments, wherein the surface is a joint between two adjacent gypsum panels and the geometry is quantified by expressing the non-planar distortion of the joint along the laser line, defining a width of the joint, measuring a slope of edges of the joint, or a combination thereof.

Embodiment 48. The system of any of these embodiments, wherein the assembly comprises a plurality of lasers.

Embodiment 49. The system of any of these embodiments, wherein the assembly further comprises leveling means configured to enable a user to manual level the assembly.

Embodiment 50. The system of any of these embodiments, wherein the leveling means comprises elevation screws.

Embodiment 51. The system of any of these embodiments, wherein the assembly is configured to be self-leveling.

Embodiment 52. The system of any of these embodiments, wherein a laser of the assembly is mounted to a pendulum.

Embodiment 53. The system of any of these embodiments, wherein the pendulum is magnetically braked.

Embodiment 54. The system of any of these embodiments, wherein the pendulum has two degrees of freedom.

Embodiment 55. The system of any of these embodiments, wherein the assembly further comprises a surface alignment feature configured to set at least one of distance of the assembly from the surface and orientation of the assembly relative to the surface.

Embodiment 56. The system of any of these embodiments, wherein the surface alignment feature comprises extensions configured to engage the wall.

Embodiment 57. The system of any of these embodiments, wherein the extensions are configured to engage the surface and set orientation by perpendicularly aligning the assembly relative to the surface.

Embodiment 58. The system of any of these embodiments, wherein the extensions comprise retractable rods.

Embodiment 59. The system of any of these embodiments, wherein the laser line has a length in a range of about 0.1 meters to about 5 meters.

Embodiment 60. The system of any of these embodiments, wherein the assembly emits the laser line at a fan angle in a range of about 10 degrees to about 160 degrees.

Embodiment 61. The system of any of these embodiments, wherein the system is configured to simultaneously visually enhance geometries of a plurality of joints.

Embodiment 62. The system of any of these embodiments, wherein the system is configured to simultaneously visually enhance a wall geometry of an entirety of the wall.

Embodiment 63. The system of any of these embodiments, wherein the laser line is horizontal and the system is configured to visually enhance the geometry of a vertical joint.

Embodiment 64. The system of any of these embodiments, wherein the laser line is vertical and the system is configured to visually enhance the geometry of a horizontal joint.

Embodiment 65. The system of any of these embodiments, wherein the joint is not horizontal and is not vertical, and the laser line is perpendicular to the joint regardless of an orientation of the joint.

Embodiment 66. The system of any of these embodiments, wherein the assembly comprises a mirror configured to redirect the laser line at the surface.

Embodiment 67. The system of any of these embodiments, wherein the mirror is oriented at an angle with respect to a mean plane of the surface, and the angle is in a range of about 45 degrees to about 60 degrees.

Embodiment 68. The system of any of these embodiments, wherein the assembly is configured to be positioned away from the surface at a distance in a range of about 0 inches to about 48 inches.

Embodiment 69. The system of any of these embodiments, wherein the reference guide comprises at least one of:
  an object configured to be physically mounted to the surface;
  a pre-defined image projected on the surface; and
  a laser image projected on the surface.

Embodiment 70. The system of any of these embodiments, wherein the laser image comprise at least 3 laser images.

Embodiment 71. The system of any of these embodiments, wherein the laser image comprises additional laser lines.

Embodiment 72. The system of any of these embodiments, wherein the additional laser lines are parallel to each other.

Embodiment 73. The system of any of these embodiments, wherein the additional laser lines are configured to be substantially perpendicular to the joint.

Embodiment 74. The system of any of these embodiments, wherein the additional laser lines are at different angles with respect to the assembly.

Embodiment 75. The system of any of these embodiments, wherein each of the additional laser lines are at an angle of separation relative to an adjacent laser line, and the angles of separation are identical.

Embodiment 76. The system of any of these embodiments, wherein the additional laser lines are at a same angle with respect to the assembly.

Embodiment 77. The system of any of these embodiments, wherein the laser image comprises a grid of laser dots.

Embodiment 78. The system of any of these embodiments, wherein the laser dots comprises a wavelength of light that differs from that of a laser line.

Embodiment 79. The system of any of these embodiments, wherein horizontal and vertical distances between the laser dots are configured to be calculated by a computer based on the digital image from the camera.

Embodiment 80. The system of any of these embodiments, wherein the camera and the computer are combined in a single device.

Embodiment 81. A method of assessing a geometry of a joint between drywall panels on a wall, the method comprising:
  (a) projecting a laser image across the joint;
  (b) positioning or simulating a reference guide on the wall adjacent to the laser image;

(c) digitally imaging the laser image and the reference guide; and (d) processing the digital images and quantifying the geometry of the joint based on the digital images, parameters of the laser image and the reference guide, such that a quality of the joint is determined.

Embodiment 82. The method of any of these embodiments, wherein step (a) comprises projecting a plurality of laser images across the joint.

Embodiment 83. The method of any of these embodiments, wherein step (b) comprises at least one of:

physically mounting an object to the wall;
projecting a pre-defined image projected on the wall; and
projecting a laser image on the wall.

Embodiment 84. The method of any of these embodiments, wherein step (c) comprises using a camera, and step (d) comprises quantifying the geometry of the joint further based on a distance between the camera and the wall.

Embodiment 85. The method of any of these embodiments, wherein step (d) comprises quantifying a geometry of a plurality of joints.

Embodiment 86. The method of any of these embodiments, wherein step (d) comprises quantifying a geometry of an entirety of the wall.

Embodiment 87. The method of any of these embodiments, wherein the laser image is projected from an assembly, and the method further comprises the assembly self-leveling.

Embodiment 88. The method of any of these embodiments, wherein the laser image is projected from an assembly, and the method further comprises the assembly magnetically-braking.

Embodiment 89. The method of any of these embodiments, wherein the laser image is projected from an assembly, and the method further comprises aligning the assembly perpendicular to the wall.

Embodiment 90. The method of any of these embodiments, wherein the laser image is a laser line.

Embodiment 91. A method of preparing a surface, the method comprising:

(a) constructing a wall having panels that engage at intersections;

(b) detecting a planarity and non-planarity of the intersections, and adjusting non-planar intersections into planar intersections;

(c) applying material to the planar intersections to conceal the planar intersections and form joints; and then (d) detecting a planarity and non-planarity of the joints, and adjusting non-planar joints into planar joints.

Embodiment 92. The method of any of these embodiments, wherein step (a) comprises fastening the panels to a frame to form the wall.

Embodiment 93. The method of any of these embodiments, wherein step (b) comprises:

visually enhancing a geometry of the intersections by projecting a laser line across the intersections, the laser line is substantially perpendicular to the intersections, and the laser line enables enhanced, qualitative user visualization of the intersections and non-planar distortion in the intersections relative to a plane defined by the wall.

Embodiment 94. The method of any of these embodiments, wherein adjusting non-planar intersections into planar intersections in step (b) comprises moving the panels.

Embodiment 95. The method of any of these embodiments, wherein step (b) comprises:

(1) projecting a laser image across the intersections;
(2) positioning or simulating a reference guide on the wall adjacent to the laser image;
(3) digitally imaging the laser image and the reference guide; and
(4) processing the digital images and quantifying the geometry of the intersections based on the digital images, parameters of the laser image and the reference guide, such that a quality of the intersections is determined.

Embodiment 96. The method of any of these embodiments, wherein the panels are drywall panels, and step (c) comprises at least one of taping, applying plaster or joint compound, wiping, washing, and wet or dry sanding the planar intersections.

Embodiment 97. The method of any of these embodiments, wherein step (d) comprises:

visually enhancing a geometry of the joints by projecting a laser line across the joints, the laser line is substantially perpendicular to the joints, and the laser line enables enhanced, qualitative user visualization of the joints and non-planar distortion in the joints relative to a plane defined by the wall.

Embodiment 98. The method of any of these embodiments, wherein step (d) comprises:

(1) projecting a laser image across the joints;
(2) positioning or simulating a reference guide on the wall adjacent to the laser image;
(3) digitally imaging the laser image and the reference guide; and
(4) processing the digital images and quantifying the geometry of the joints based on the digital images, parameters of the laser image and the reference guide, such that a quality of the joints is determined.

Embodiment 99. The method of any of these embodiments, wherein the panels are drywall panels, and adjusting non-planar joints into planar joints in step (d) comprises at least one of wet or dry sanding, taping, applying plaster or joint compound, wiping and washing the non-planar joints.

Embodiment 100. A laser system for visually enhancing a geometry of a joint between panels that form at least a portion of a wall, the system comprising:

an assembly configured to be positioned on a surface other than the wall itself, the assembly is configured to project a laser line across at least a portion of the wall and the joint, the laser line is projected at an angle of incidence relative to a plane defined by the wall, the angle of incidence is in a range of about 1 degree to about 60 degrees, the laser line is substantially perpendicular to the joint, and the laser line enables enhanced, qualitative user visualization of the joint and non-planar distortion in the joint relative to the plane defined by the wall.

Embodiment 101. A system for measuring a geometry of a joint between panels that form at least a portion of a wall, the system comprising:

an assembly configured to be positioned on a surface other than the wall itself, the assembly is configured to project a laser line across at least a portion of the wall and the joint, the laser line is projected at an angle of incidence relative to a plane defined by the wall, the angle of incidence is in a range of about 1 degree to about 60 degrees, the laser line is substantially perpendicular to the joint, and the laser line enables enhanced, qualitative user visualization of the joint and non-planar distortion in the joint relative to the plane defined by the wall;

a reference guide configured to be located on the wall or simulated adjacent to the laser line;
a camera configured to digitally image the laser line and the reference guide; and
a computer configured to be coupled to the camera and quantify the geometry of the wall based on the digital images, parameters of the laser line, the reference guide and a distance between the camera and the wall, such that a quality of the joint is measured.

This written description uses examples to disclose the embodiments, including the best mode, and also to enable those of ordinary skill in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A laser system for visually enhancing a surface, comprising:
    an assembly comprising a self-leveling laser that projects a laser line at an angle of at least 20 degrees to not greater than 60 degrees relative to a mean plane defined by the surface and perpendicularly across a joint formed between a first drywall panel and a second drywall panel, wherein the laser line enables user visualization and quantification of non-planar distortion in the joint and between the first drywall panel and the second drywall panel relative to the mean plane defined by the surface formed by the first drywall panel and the second drywall panel, and wherein the non-planar distortion in the joint is expressed as a slope of the joint defined by a maximum protrusion or recession in the joint divided by half of a maximum width of the joint.

2. The laser system of claim 1, wherein the surface comprises a wall formed by the first drywall panel and the second drywall panel.

3. The laser system of claim 2, wherein the wall comprises a vertical wall, a ceiling, or an angled wall.

4. The laser system of claim 1, wherein the assembly comprises a plurality of lasers.

5. The laser system of claim 1, wherein the assembly further comprises leveling means, wherein the leveling means enables a user to manually level the assembly.

6. The laser system of claim 1, wherein the laser line has a length in a range of 0.1 meters to 10 meters.

7. The laser system of claim 1, wherein the assembly emits the laser line at a fan angle in a range of 10 degrees to 160 degrees.

8. The laser system of claim 1, wherein the assembly further comprises a surface alignment feature, wherein the surface alignment feature sets at least one of distance of the assembly from the surface and orientation of the assembly relative to the surface.

9. A system of measuring geometry of a surface, comprising:
    an assembly comprising a self-leveling laser that projects a laser line at an angle of at least 20 degrees to not greater than 60 degrees relative to a mean plane defined by the surface and perpendicularly across a joint formed between a first drywall panel and a second drywall panel, wherein the laser line enables user visualization and quantification of non-planar distortion in the joint and between the first drywall panel and the second drywall panel relative to the mean plane defined by the surface formed by the first drywall panel and the second drywall panel;
    a camera that digitally images the laser line; and
    a processor coupled to the camera, wherein the processor quantifies the geometry of the joint based on the digital images, parameters of the laser line, and a distance between the camera and the surface to determine a quality of the joint, and wherein the geometry of the joint is expressed as a slope of the joint defined by a maximum protrusion or recession in the joint divided by half of a maximum width of the joint.

10. The system of claim 9, wherein the surface comprises a wall formed by the first drywall panel and the second drywall panel and the geometry is quantified by expressing the non-planar distortion of the joint along the laser line, defining the maximum width of the joint, and measuring the slope of the joint.

11. The system of claim 9, wherein the system simultaneously visually enhances geometries of a plurality of surfaces, and wherein the plurality of surfaces include at least a joint between two drywall panels, a wall, a face of one or more wall studs, a surface of insulation, or a combination thereof.

12. The system of claim 9, wherein the system simultaneously visually enhances a wall geometry of an entirety of a wall.

13. The system of claim 9, wherein the laser line is horizontal and the system visually enhances the geometry of a vertical joint.

14. The system of claim 9, wherein the laser line is vertical and the system visually enhances the geometry of a horizontal joint.

15. The system of claim 9, wherein the assembly further comprises a mirror, wherein the mirror redirects the laser line at the surface.

16. The system of claim 15, wherein the mirror is oriented at an angle with respect to a mean plane of the wall, and the angle is in a range of 45 degrees to 60 degrees.

17. A method of assessing geometry of a joint between drywall panels on a wall, comprising:
  (a) projecting a self-leveling laser line at an angle of at least 20 degrees to not greater than 60 degrees relative to a mean plane defined by the wall and perpendicularly across the joint formed between the drywall panels;
  (b) positioning a reference guide by physically positioning the reference guide on the wall adjacent to the laser image;
  (c) digitally imaging the laser line and the reference guide;
  (d) processing the digital images and quantifying the geometry of the joint based on the digital images, parameters of the laser line, and the reference guide to determine a quality of the joint, wherein the geometry of the joint is expressed as a slope of the joint defined by a maximum protrusion or recession in the joint divided by half of a maximum width of the joint; and
  (e) providing a recommendation to a drywall finisher if non-planar distortion in the joint and between the drywall panels relative to a plane defined by the drywall panels is detected.

18. The method of claim 17, wherein step (a) comprises projecting a plurality of laser lines across the joint.

19. The method of claim 17, wherein step (c) comprises using a camera, and step (d) comprises quantifying the geometry of the joint further based on a distance between the camera and the wall.

20. The method of claim 17, wherein step (d) comprises quantifying a geometry of a plurality of joints.

* * * * *